April 6, 1943.
M. W. PEEBLES ET AL
2,316,143
METHOD AND APPARATUS FOR REPRODUCING THE
SURFACE CONTOUR OF PATTERNS IN PLASTICS
Filed Oct. 24, 1940
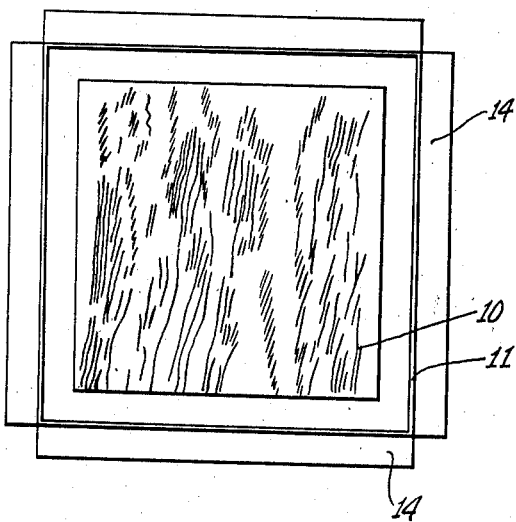
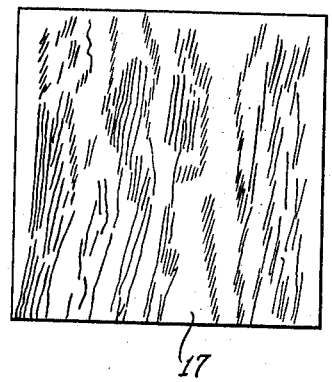
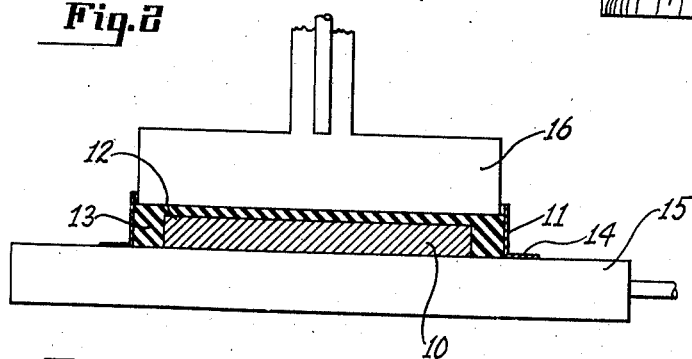
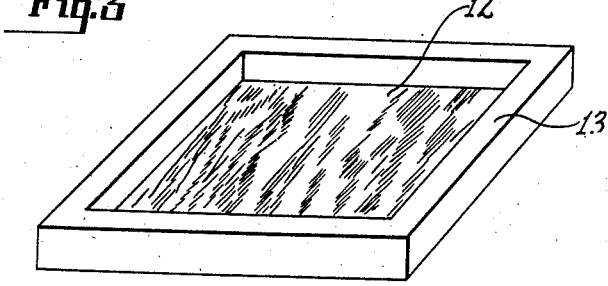
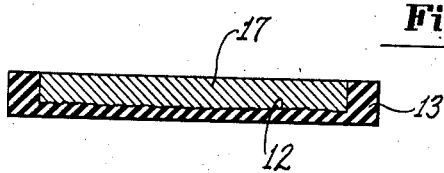
INVENTORS
MAYBEL WAITE PEEBLES
JOHN C. WAITE
JEROME M. WAITE
BY
ATTORNEY Patented Apr. 6, 1943

2,316,143

UNITED STATES PATENT OFFICE 2,316,143

METHOD AND APPARATUS FOR REPRODUCING THE SURFACE CONTOUR OF PATTERNS IN PLASTICS

Maybel Waite Peebles, John C. Waite, and Jerome M. Waite, Albuquerque, N. Mex.

Application October 24, 1940, Serial No. 362,640

10 Claims. (Cl. 41—25)

This invention relates to a method and apparatus for reproducing in plastic material the surface configuration of a pattern and is intended primarily for reproducing the grain configuration of wood.

One object of the invention is to provide a method whereby the grain or other surface configuration of wood or the like may be easily and accurately reproduced in plastic material.

A further object of the invention is to provide a simple inexpensive method of producing a matrix having thereon a negative reproduction of the pattern, from which a positive reproduction may be taken in plastic material, and which will be substantially free from thin edged ridges, hair lines or the like which would be liable to injury in removing the matrix from the pattern and would interfere with the taking of an accurate reproduction from the matrix.

A further object of the invention is to provide a method of treating the plastic reproduction to impart to the grain or other structure thereon the desired appearance in the finished product.

A further object of the invention is to provide a matrix which can be easily separated from the pattern or plastic casting without injury to the matrix, pattern or the casting.

A further object of the invention is to provide a flexible matrix comprising in itself a form in which the plastic material may be cast.

Other objects of the invention may appear as the method and apparatus are described in detail.

In the accompanying drawing Fig. 1 is a plan view of the frame and pattern positioned to receive the material on which the matrix is to be formed; Fig. 2 is a sectional view taken through the frame, pattern and matrix and showing the same in a vulcanizing press; Fig. 3 is a perspective view of the matrix; Fig. 4 is a sectional view of the matrix with the plastic casting therein; and Fig. 5 is a plan view of the finished plastic casting.

The method may be employed in reproducing the surface contour of patterns of various kinds but is especially well adapted to the reproduction of the grain structure of a wood pattern and is herein illustrated and described more particularly as used for that purpose, but without intending to limit it thereto.

The method of reproducing in plastic material the surface configuration of a wood pattern consists, briefly, in first selecting a section of wood having the desired grain configuration, or other surface contour, which it is desired to reproduce and cutting the same to the desired size and shape to form a pattern. The surface of this pattern is covered with unvulcanized rubber, preferably of such a composition that it will be converted by vulcanization into flexible rubber, and the rubber is then subjected to heat and pressure to soften the rubber to enable portions of it to flow into the recesses, grain cavities or pores in the pattern and to conform the contacting surface of the rubber accurately to the surface contour of the pattern, under the pressure to which it is subjected, and to vulcanize the rubber. The rubber when vulcanized and removed from the pattern constitutes a matrix having on one surface thereof a negative reproduction of the surface contour of the pattern. This surface of the matrix is then covered with plastic material and the contacting surface of the latter is caused to conform accurately to the surface configuration of the matrix, thereby producing a plastic cast having thereon a positive reproduction of the surface configuration of the pattern. The face of this casting may then be treated to impart thereto the desired finished appearance, as by adding color to the face of the casting to impart thereto substantially the appearance of the original pattern.

The impression may be taken in rubber from the pattern in any suitable manner, preferably the pattern 10 is placed within a suitable frame or mold box 11 of a depth sufficiently greater than the thickness of the pattern to enable the required amount of unvulcanized rubber to be placed in the frame above the pattern. If the matrix is to be in the form of a substantially flat plate the frame is shaped to fit snugly about the pattern. However, it is preferable to provide the matrix with edge portions which extend upwardly above that surface thereof which bears the impression so that the matrix in itself will constitute a mold box in which the plastic material may be cast. For this purpose the frame is provided with horizontal dimensions slightly greater than the corresponding dimensions of the pattern so as to provide spaces between the edges of the pattern and the adjacent sides of the frame. The rubber is packed in these spaces as well as being placed over the surface of the pattern and when vulcanized and inverted the impression surface 12 of the matrix, as shown in Fig. 3, will be provided on all sides with the upwardly extending edge portions 13. The frame 11 may be of any suitable construction. In the present instance it is substantially square and is formed by four sections of angle iron 14, the vertical webs of which are welded or otherwise rigidly connected one to the other at the corners of the frame.

The rubber may be subjected to heat and pressure in any suitable manner. Preferably, however, the frame, pattern and uncured rubber are placed in an ordinary vulcanizing press, the table 15 and pressure head or ram 16 of which are shown conventionally in Fig. 2, where the pressure head is shown in its final position. The table 15 and pressure head 16 may be heated in any suitable manner, as by circulating steam through the same in the usual manner. When the frame is open at its bottom as well as at the top, as shown in the drawing, it may be preferable to assemble the frame, pattern and unvulcanized rubber on the table 15. The vulcanizing press is then operated in the usual manner to cause the pressure head 16 to enter the frame 11 and exert the necessary pressure on the rubber while the latter is in a softened condition, the pressure head being preferably of such size and shape that it will substantially fill the upper portion of the frame and will therefore exert pressure on all parts of the rubber. When the vulcanization has been completed the rubber is removed from the frame and from the pattern, the flexibility of the rubber enabling the same to be stripped from the pattern without injury either to the matrix surface or to the surface of the pattern.

In coarse grained woods the grain cavities and pores are relatively deep and taper to thin edges. If the rubber is permitted to enter these cavities and pores for the full depth thereof substantial resistance is offered to the removal of the matrix from the pattern and there is danger of injuring either the matrix or the pattern itself in separating the same. Further, a reproduction of such a coarse grain will cause the formation on the face of the matrix of fine hairs and thin edged ridges which, due to their lack of stability are difficult to reproduce in plastic and if so reproduced are difficult to remove from the plastic material and are very apt to injure the matrix or to be themselves injured. To avoid these objectionable features it is preferable to substantially fill the grain cavities and pores with a compressible substance, which will yield under the vulcanizing pressure to permit the softened rubber to enter the cavities and pores but will limit the extent to which it may so enter the same. The substance used for so filling the cavities and pores may be of various kinds but is preferably a comminuted silicate. Powdered or granular quartz, ground glass and granular dolomite have given good results in practice. This silicate is dusted or otherwise spread over the surface of the pattern and is rubbed into or otherwise caused to enter the pores and cavities in the pattern. The surplus silicate is then removed from the pattern leaving the pores and cavities substantially filled. The unvulcanized rubber is then placed over the pattern and subjected to heat and pressure, as above described, with the result that while the surface contour of the pattern is accurately reproduced on the matrix the hairs and thin edges are largely, if not entirely, eliminated from the matrix.

When reproduction is to be made of a pattern having a carved surface it is of course desirable that the rubber should fully enter the recesses or cavities in the pattern, so that the matrix will be provided with an exact negative reproduction of the carved surface. Therefore the carved recesses of the cavities are not filled with silicate but the walls thereof are dusted with silicate so as to fill the grain structure and pores thereof and all surplus silicate is removed so that the recesses retain their initial shape during the forming of the matrix but the rubber is prevented from entering the grain structure or pores in such a manner as to interfere with the removal of the matrix. Due to the flexibility of the matrix it can readily be removed from such a carved pattern even though the recesses may be undercut, because the rubber will yield laterally as well as vertically to enable it to disengage itself from the pattern.

In a press of the type shown in the drawing the matrix is formed in an inverted position and when it has been vulcanized and removed from the frame and pattern it is inverted as shown in Fig. 3, and the mold box formed by the upwardly extending edge portions 13 thereof is filled, or partially filled, with a suitable plastic material the contacting surface of which is caused to conform to the surface configuration of the matrix. The plastic material may be applied in a sufficiently fluid condition to permit it to flow readily into the cavities and pores of the matrix. If a less fluid plastic is used a light pressure may be applied thereto, care being taken not to distort the contour of the matrix. When the box-like structure of the matrix is completely filled with the plastic material the latter may be formed flush with the edges of that structure by means of a straight edge or the like, thus providing the finished casting 17, as shown in Fig. 4, with a flat rear surface. The casting may be formed of any suitable plastic material and very satisfactory results have been secured with various commercial casting and molding plastics.

The face of the casting may be treated in various ways to impart thereto a finished appearance. In some cases it is desired to impart color to the grain surface of the casting to simulate the color and appearance of the pattern, while in other cases it may be desired to bring out or accentuate the grain structure in other ways. With many kinds of plastic material it is preferable to first treat the face of the casting to reduce the porosity thereof. This may be done by applying thereto a suitable oil, such as boiled linseed oil, and allowing the same to cure. When the treated surface of the same is thoroughly dry, pigment may be applied thereto. For example a dry pigment may be mixed with linseed oil and brushed or otherwise applied to the face of the casting and the pigment caused to enter the cavities and pores therein. The surplus of the oil and pigment is then removed with the result that the grain structure stands out clearly in the color of the pigment. The shading of the color varies according to the depth of the cavities and if the color of the pigment has been properly selected the grain structure of the casting will then have very much the appearance of the grain of the pattern. If desired, a pigment may be mixed with the plastic material prior to casting so as to impart thereto a base color which, for example, may correspond to the color of the wood of the pattern. When this is done and the grain structure is defined by a different pigment the appearance of the casting will be substantially that of the original wood pattern. After the grain has been so treated the face of the casting, as a whole, may be finished with wax, varnish or the like in much the same manner as a wood surface is finished.

It will be obvious that the treatment of the casting may be greatly varied according to the effect which it is desired to produce. For example, a white plastic casting may be treated with a clear oil to reduce the porosity thereof and after having dried may be dusted with a dry pigment of any suitable color which is rubbed into, or otherwise caused to enter, the grain cavities and pores of the casting, the surplus pigment being brushed off or otherwise removed so that the only pigment remaining on the face of the casting is that which is lodged in the cavities and pores. Any suitable finishing material such as wax or varnish may then be applied to the face of the casting and when properly finished the casting will have a glossy white face on which the grain structure will be outlined as "veinings," so that it will have an appearance somewhat similar to that of marble.

It is sometimes desirable in finishing the casting to reduce or remove a part of the grain structure and to accentuate other parts thereof. This is easily accomplished on the plastic casting by sanding or rubbing down the selected portions of the same with an abrasive so as to reduce said selected portions to the desired extent, which of course results in accentuating the remaining parts of the grain structure.

While we have described a preferred manner of performing our method and have described and shown one form of matric we wish it to be understood that we do not wish to be limited to the details thereof as various modifications may occur to a person skilled in the art.

Having now fully described our invention, what we claim as new and desire to secure by Letters Patent, is:

1. The method of producing a matrix having a negative reproduction of the surface contour of a wood pattern which comprises dusting the surface of said pattern with a finely comminuted substance and causing the same to enter the grain cavities and pores of said surface, placing over said surface a layer of unvulcanized rubber of a composition which will be converted by vulcanization into soft flexible rubber and subjecting said rubber to heat and pressure to soften said rubber, pressing portions thereof into the grain cavities and pores in said pattern and vulcanizing said rubber while in contact with said pattern, thereby imparting to said vulcanized rubber an exact negative reproduction of the surface contour of said pattern, and then removing said rubber from said pattern.

2. The method of reproducing in plastic material the surface contour of a wood pattern which comprises introducing into the grain cavities and pores in the surface of said pattern a compressible substance, placing over said surface of said pattern a layer of unvulcanized rubber of a composition which will be converted by vulcanization into soft flexible rubber, subjecting said rubber to heat and pressure to soften the same and press portions thereof into the cavities of said pattern and to vulcanize said rubber and thereby form a flexible rubber matrix having thereon a negative reproduction of the surface contour of the pattern, removing said matrix from said pattern, placing over said matrix a layer of plastic material and causing the latter to contact all parts of the matrix surface and thus produce on said plastic material a positive reproduction of the surface contour of said pattern, permitting said plastic material to harden and then removing the flexible matrix from the hardened plastic material.

3. The method of reproducing in plastic material the surface contour of a wood pattern which comprises dusting the surface of said pattern with a finely comminuted silicate, placing over said dusted surface a layer of unvulcanized rubber, subjecting said rubber to heat and pressure to vulcanize the same and cause portions thereof to enter the cavities in said pattern and thus produce a rubber matrix having thereon a negative reproduction of the surface contour of the pattern, removing said matrix from said pattern, placing over said matrix a layer of plastic material and causing the latter to contact all parts of the matrix surface and thus produce on said plastic material a positive reproduction of the surface contour of the pattern, permitting said plastic material to harden and then removing the same from said matrix.

4. The method of reproducing in plastic material the grain configuration of a wood pattern which comprises substantially filling the grain cavities and pores in the surface of said pattern with a compressible substance, placing over said surface of said pattern unvulcanized rubber, subjecting said rubber to heat and pressure to cause portions thereof to enter said cavities and pores and compressing the substance therein and to vulcanize said rubber to form a matrix having thereon a negative reproduction of the surface contour of the pattern, removing said matrix from the pattern, placing over said matrix a layer of plastic material, causing the latter to contact all parts of the matrix surface and thus produce on said plastic material a positive reproduction of the surface contour of the pattern, permitting said plastic material to harden and then removing the same from said matrix.

5. The method of reproducing in plastic material the surface grain configuration of a wood pattern which comprises covering said pattern with unvulcanized rubber, subjecting said rubber to heat and pressure to conform the contacting surface thereof to the surface contour of said pattern and cause portions thereof to enter the grain cavities of said pattern and to vulcanize said rubber, thus producing a matrix having on one surface thereof a negative reproduction of the grain configuration of said pattern, removing said matrix from said pattern, applying to said surface of said matrix a plastic material and causing the contacting surface of the latter to conform to the surface contour of said matrix and drying said plastic material to harden the same, thus producing a plastic casting having on one surface thereof a positive reproduction of the grain configuration of said pattern, removing the matrix, treating the face of said casting to reduce the porosity thereof, applying a pigment to said surface and causing the same to enter the grain cavities therein, removing the excess pigment and then treating the face of said casting with a finishing material.

6. The method of reproducing in plastic material the surface grain configuration of a wood pattern which comprises covering said pattern with unvulcanized rubber, subjecting said rubber to heat and pressure to conform the contacting surface thereof to the surface contour of said pattern and cause portions thereof to enter the grain cavities of said pattern and to vulcanize said rubber, thus producing a matrix having on one surface thereof a negative reproduction of the grain configuration of said pattern, removing said matrix from said pattern, applying to said surface of said matrix a plastic material and causing the contacting surface of the latter to conform to the surface contour of said matrix and drying said plastic material to harden the same, thus producing a plastic casting having on one surface thereof a positive reproduction of the grain configuration of said pattern, removing the matrix, treating the surface of said casting with oil to reduce the porosity thereof, drying the same, applying to said dried surface an oil containing pigment and causing said pigment to enter the grain cavities in said surface, removing the excess oil and pigment and then treating said surface with a finishing material.

7. The method of reproducing in plastic material the surface grain configuration of a wood pattern which comprises covering said pattern with unvulcanized rubber, subjecting said rubber to heat and pressure to conform the contacting surface thereof to the surface contour of said pattern and cause portions thereof to enter the grain cavities of said pattern and to vulcanize said rubber, thus producing a matrix having on one surface thereof a negative reproduction of the grain configuration of said pattern, removing said matrix from said pattern, applying to said surface of said matrix a plastic material and causing the contacting surface of the latter to conform to the surface contour of said matrix and drying said plastic material to harden the same, thus producing a plastic casting having on one surface thereof a positive reproduction of the grain configuration of said pattern, removing the matrix, applying an abrasive to selected portions of the grain structure on said casting to reduce the same and thereby accentuate other portions thereof, treating said surface of said casting to reduce the porosity thereof, applying a pigment to said surface and causing the same to enter the grain cavities therein, removing the excess pigment and then treating said surface with a finishing material.

8. The method of reproducing in plastic material the surface grain configuration of a wood pattern which comprises covering said pattern with unvulcanized rubber, subjecting said rubber to heat and pressure to conform the contacting surface thereof to the surface contour of said pattern and cause portions thereof to enter the grain cavities of said pattern and to vulcanize said rubber, thus producing a matrix having on one surface thereof a negative reproduction of the grain configuration of said pattern, removing said matrix from said pattern, mixing pigment with a plastic material to provide the same with a base color, applying said plastic material to said surface of said matrix and causing the contacting surface of said plastic material to conform to the surface contour of said matrix, drying said plastic material to harden the same, thus producing a plastic casting having on one surface thereof positive reproduction of the grain configuration of said pattern, removing said matrix, treating the surface of said casting to reduce the porosity thereof, applying a pigment of a color different from said base color to the face of said casting and causing the same to enter the grain cavities therein, removing the excess pigment, and then treating said surface with a finishing material.

9. The method of preparing a matrix for reproducing the surface configuration of a wood pattern which comprises substantially filling the pores and grain cavities of the pattern surface with a compressible substance, placing in contact with said surface a mass of unvulcanized soft rubber and subjecting said rubber to heat and pressure to soften said rubber and cause the same to enter said pores and grain cavities and compress said substance therein and to vulcanize said rubber, thereby producing a flexible matrix having on one surface thereof a negative reproduction of a surface contour of the pattern.

10. The method of preparing a matrix for reproducing the surface grain configuration of a wood pattern which comprises dusting the surface of said pattern with a comminuted silicate and substantially filling the grain cavities and pores therewith, removing the excess silicate, placing over said surface a layer of unvulcanized soft rubber, subjecting said rubber to heat and pressure to cause portions thereof to enter said cavities and pores and compress the silicate therein and to vulcanize said rubber, thereby producing a flexible matrix having on one surface thereof a negative reproduction of the grain structure of said pattern, and flexing said matrix to remove the same from said pattern.

MAYBEL WAITE PEEBLES.
JEROME M. WAITE.
JOHN C. WAITE.